United States Patent [19]

Lion

[11] Patent Number: 5,884,212
[45] Date of Patent: Mar. 16, 1999

[54] PROCESS FOR MONITORING TRAFFIC FOR AUTOMATIC VEHICLE INCIDENT DETECTION

[75] Inventor: Didier Lion, Clamart, France

[73] Assignee: Thomson-CSF, Paris, France

[21] Appl. No.: 722,139

[22] PCT Filed: Apr. 11, 1995

[86] PCT No.: PCT/FR95/00464

§ 371 Date: Oct. 15, 1996

§ 102(e) Date: Oct. 15, 1996

[87] PCT Pub. No.: WO95/28653

PCT Pub. Date: Oct. 26, 1995

[30] Foreign Application Priority Data

Apr. 15, 1994 [FR] France ................................ 94 04522

[51] Int. Cl.$^6$ .............................. G01S 13/92; G08G 1/08
[52] U.S. Cl. ........................... 701/117; 701/96; 701/119; 340/933; 340/936; 340/943; 382/104
[58] Field of Search ................................ 701/117, 119, 701/96; 340/933, 934, 935, 936, 943, 903, 905; 382/104; 348/148, 149

[56] References Cited

U.S. PATENT DOCUMENTS

| | | | |
|---|---|---|---|
| 4,866,438 | 9/1989 | Knisch | 340/936 |
| 5,402,346 | 3/1995 | Lion et al. | 701/117 |
| 5,537,110 | 7/1996 | Ioda et al. | 340/942 |
| 5,555,036 | 9/1996 | Harnett et al. | 340/933 |
| 5,617,086 | 4/1997 | Klashinsky et al. | 340/907 |

*Primary Examiner*—Tan Q. Nguyen
*Attorney, Agent, or Firm*—Oblon, Spivak, McClelland, Maier & Neustadt, P.C.

[57] ABSTRACT

A process for monitoring traffic for automatic vehicle incident detection using radar waves to detect the vehicles, their instantaneous speed and their distance. The process consists in correlating the information obtained regarding vehicles in one and the same distance bracket during two consecutive processing time intervals, so as to determine, at each instant, the acceleration of each vehicle and a prediction of its speed, and in then detecting an incident in a distance bracket by detecting the passing of the speed of a vehicle below a given speed threshold. The advantages of the process resides in rapid incident detection in regard to a road or motorway network, with a view to informing the users rapidly.

20 Claims, 5 Drawing Sheets

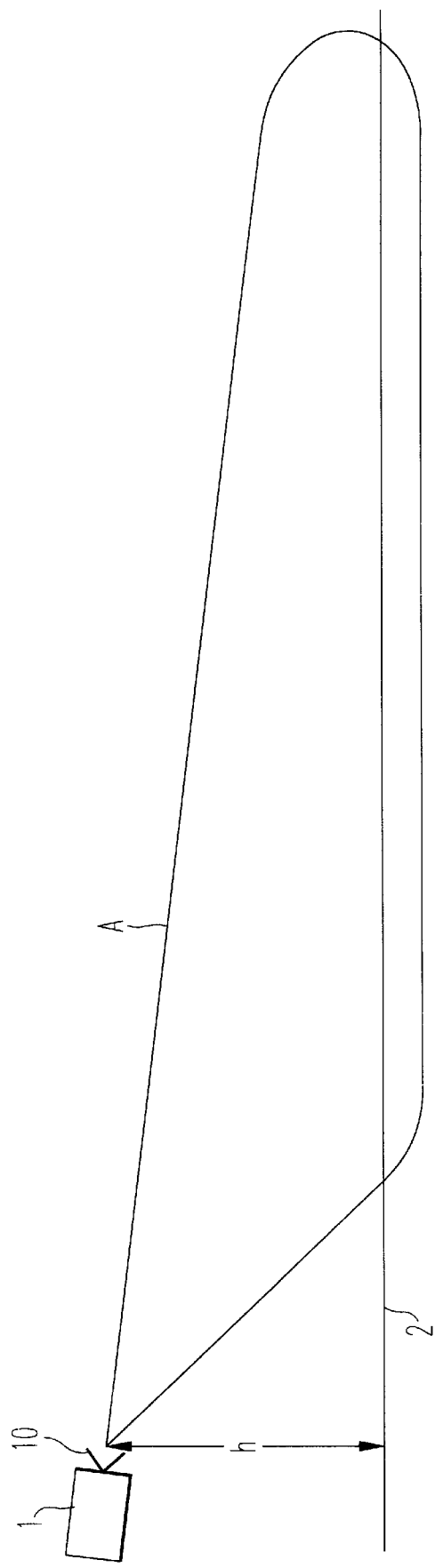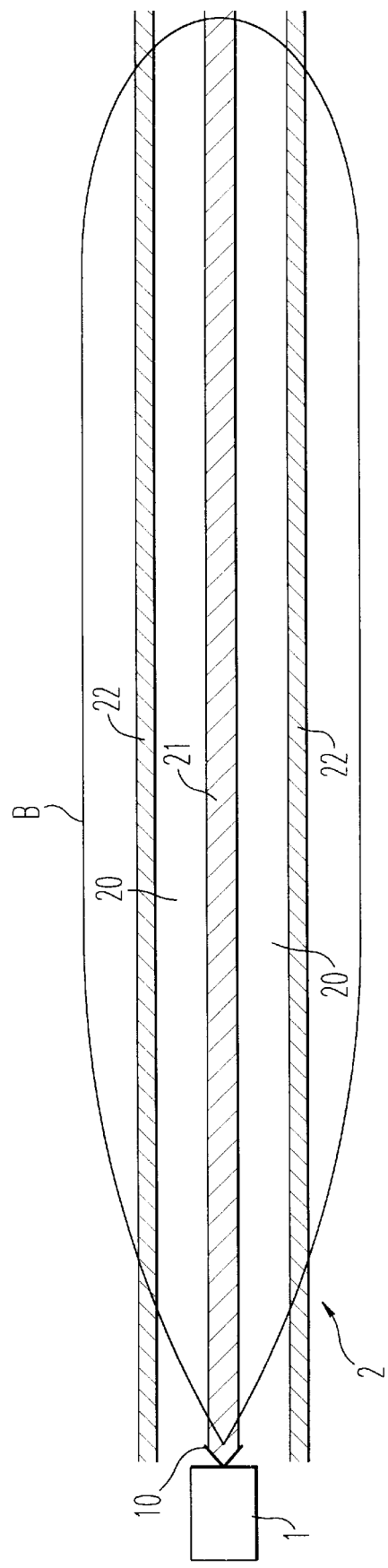

PROCESS FOR MONITORING TRAFFIC FOR AUTOMATIC VEHICLE INCIDENT DETECTION

BACKGROUND OF THE INVENTION

1. Field of the Invention

The subject of the present invention is a process for monitoring traffic for automatic vehicle incident detection.

The application at which the invention is more particularly aimed relates to the monitoring of road or motorway traffic, conventionally referred to generically as Automatic Incident Detection (AID).

In this application it is sought especially to be able to detect a vehicle coming to a stop on traffic lanes or on hard shoulders. Other parameters may beneficially be supplied, such as the detection of holdups or the state of the traffic flow.

Monitoring the traffic on a road or motorway is very important since its aim is to improve the fluidity of the traffic and the safety of users. It is therefore paramount to know how to detect any incident or slowdown as quickly as possible so as to forewarn the users via variable-message road signs, thereby limiting the risks of pileups, and to involve the emergency services rapidly if necessary.

2. Discussion of the Background

The monitoring of road traffic is presently undertaken using various techniques which may be classed into two categories, on the one hand techniques based on pointwise analysis of a section of road or of motorway and, on the other hand, techniques based on overall analysis of this same section.

In the first case, only certain points of the road, located at predetermined distances from one another, are observed. Analysis of traffic parameters at these various points, such as the mean speed of the vehicles or the flow rate, makes it possible to detect, by applying special computational algorithms, the consequences of a possible incident between these points.

A first very widely used technology consists in placing induction loops under the road. The variation in the field induced in such loops makes it possible to ascertain whether a vehicle has or has not passed. The main advantage of this technology lies in the fact that the induction loops operate irrespective of climatic conditions, by day and by night. However, it is unwieldy and expensive to install these loops, and is difficult, or even impossible, to carry out maintenance or to replace loops in the event of a breakdown.

A second technology consists in video cameras located at the various points which one wishes to analyse over a given section, each camera being associated with an automatic processing of images. It is very simple to install the video cameras, but their performance is inconclusive since it depends strongly on the climatic conditions and on the lighting conditions. Furthermore, the algorithms used in image processing are complex and require considerable computational power.

To alleviate the problem of the climatic conditions, a third known technology, again implementing a technique of pointwise analysis of a section of road or of motorway, employs a radar, either a continuous-wave stationary or pulsed Doppler radar. A technique which uses a continuous-wave stationary radar to extract various parameters, such as speed or length, is for example described in the document U.S. Pat. No. 4,985,705. Moreover, refer to the document FR 2,695,742 filed by the Applicant for the description of a pulsed Doppler radar, whose particular positioning and associated algorithm make it possible to extract various parameters (especially the number of vehicles per traffic lane, the speed of the vehicles, the length of the vehicles).

The major drawback of the three technologies above, based on pointwise analysis of a section of road, is that detection of an incident is not immediate. Indeed, an incident occurring near an analysis point is not detected; rather, only the later consequences of this incident at the measurement point are detected. The detection timescale may be very long, of the order of several minutes.

As we stated earlier, a second presently known analysis technique consists in undertaking an overall analysis of a section of road or motorway, by monitoring this section over a zone of several hundred meters, and to do so in such a way as to detect the incidents almost instantaneously. A single technology, still at the development stage, implements this technique by using a video camera associated with image processing specific to AID. The drawbacks are a detection range, hence a monitoring zone, limited to a few hundred meters, and which may be greatly reduced in the event of poor weather (rain, snow, fog) or lighting conditions, that is to say when the risks of an incident are greatest.

SUMMARY OF THE INVENTION

The idea of the present invention consists in associating the advantages afforded by a technique of overall analysis (swiftness of incident detection) with the advantages gained through the use of a radar (especially, round-the-clock operation, night and day, for the same performance).

More precisely, the subject of the present invention is a process for monitoring the traffic of vehicles able to travel on at least two lanes, of the type consisting in transmitting a UHF wave of predetermined form in accordance with a predefined radiation pattern, in receiving signals reflected by the vehicles over a given duration of acquisition $T_A$, and in processing the signals received in such a way as to detect the vehicles and in calculating, for each distance, the number of vehicles i detected as well as the instantaneous speed $V_i(t)$ at a given instant t of each vehicle, the process being characterized in that, the radiation pattern having an axis of aim substantially parallel to the direction of the lanes, and the steps of acquiring and processing the signals being iterated over consecutive time intervals (T), it furthermore includes an automatic incident detection phase consisting in performing the following iterative steps:

A first step of calculating parameters consisting in:
investigating, at each instant t, whether a vehicle i detected in the current time interval corresponds to a vehicle j detected at an instant [t−1] of the preceding time interval;
for all the vehicles i corresponding to a vehicle j, calculating, at the instant t, their acceleration $\gamma_i(t)$ by applying the relation $$\gamma_i(t) = \frac{|V_i(t)| - |V_j(t-1)|}{\Delta t}$$

in which αt represents the duration between the instants [t−1] and t,
as well as a prediction $V_i^P(t+1)$ of their speed at a time [t+1] of the following time interval, by applying the relation $$V_i^P(t+1) = \gamma_i(t) \times \alpha t + V_i(t)$$

for the other vehicles i, initializing their acceleration $\gamma_i(t)$ to the zero value;

eliminating from the processing all the other vehicles j not corresponding to any vehicle i.

A second step of incident detection based on the parameters calculated in the first step, by detecting the passing of the speed of a vehicle i below a first predetermined speed threshold $V_{thresh}$.

BRIEF DESCRIPTION OF THE DRAWINGS

The invention will be better understood with reference to the description below, given with regard to the appended figures:

FIGS. 1a and 1b illustrate an example of a radiation pattern, respectively in elevation and in plan, of a radar system implementing the process according to the invention;

DISCRIPTION OF THE PREFERRED EMBODIMENTS

Figure 2:
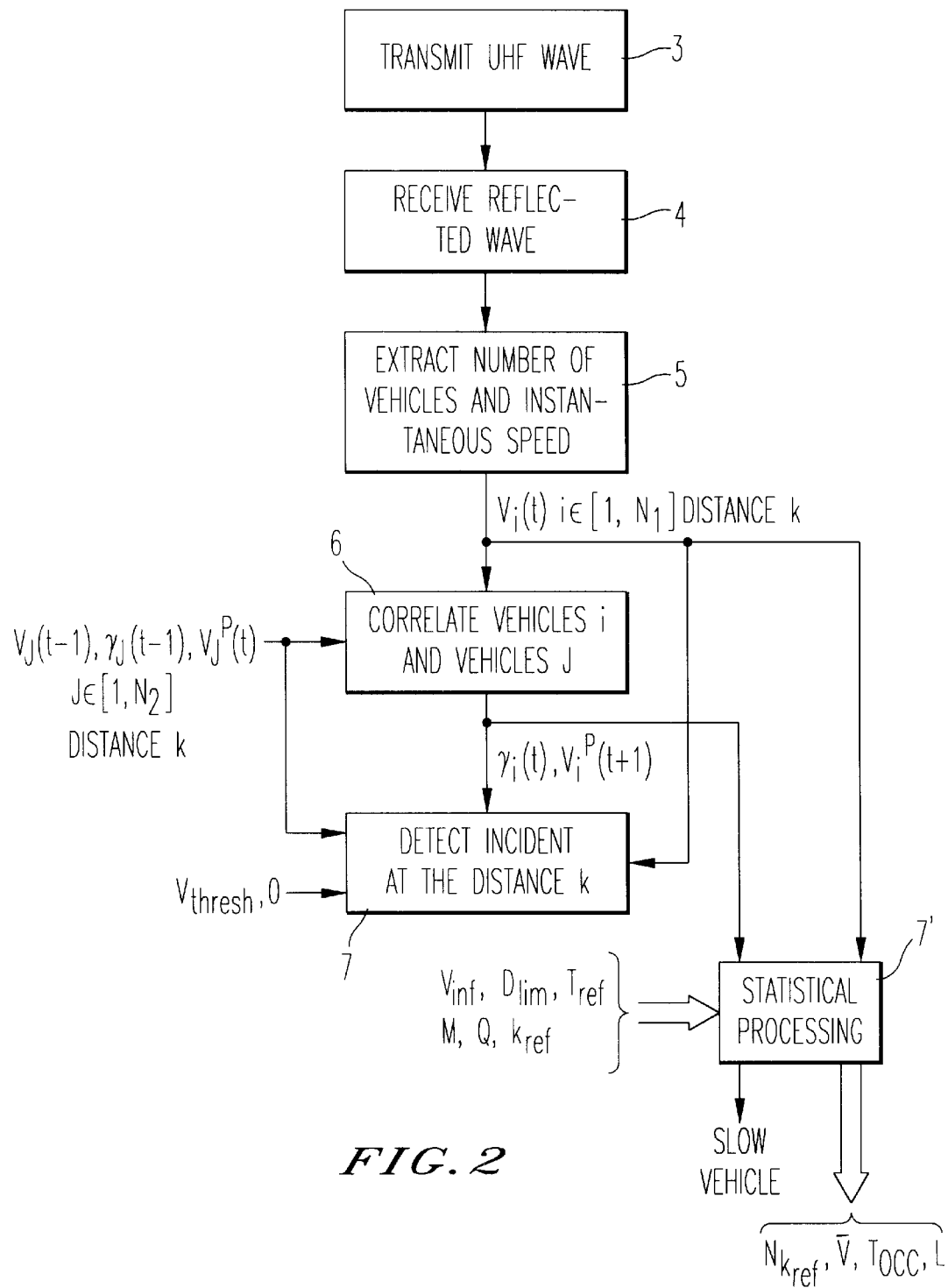
FIG. 2 illustrates the main steps of the process according to the invention.

The solution proposed for solving the problem of automatic incident detection consists in providing a radar system which can use the Doppler effect in such a way as to be able to extract the instantaneous speed of the vehicles detected, and which also has a distance-discrimination capacity. In what follows we shall describe an example of a possible radar system for the implementation of the process according to the invention.

The radiation pattern used on transmission and on reception must be such that its axis of aim is substantially parallel to the lanes which one desires to observe.

Preferably, the radar system is positioned at a height h chosen according to the zone to he observed, typically around 10 meters if one wishes to observe a zone over several hundred meters, and to do so in such a way as to limit the risks of masking one vehicle by another. Moreover, the radar system is preferably placed in the middle of the traffic lanes, the traffic in these lanes not necessarily flowing in the same direction. By appropriately choosing the radiation of the radar system, the latter will be capable of observing all the traffic lanes as well as both hard shoulders, in both directions of flow, over a length depending on the range of the radar. The radiation may advantageously be symmetric cosecant squared in azimuth and cosecant squared in elevation, so that all the signals received by the radar are substantially at the same power, and this irrespective of the position of the vehicle detected in the zone of observation of the radar.

FIGS. 1a and 1b illustrate, by way of nonlimiting example, this type of radiation respectively in elevation (curve A) and in azimuth (curve B), based on a radar system 1 located at a height h from the road 2. The radiating antenna is represented here diagrammatically by the reference 10. In FIG. 2b it may be noted that the observed zone is a portion of motorway consisting of two oppositely flowing lanes 20 separated by a central reservation 21, and of two hard shoulders 22.

The main steps of the monitoring process according to the invention are represented diagrammatically in FIG. 2, for a given distance bracket.

Following the transmission at 3 of a UHF wave of predetermined form and according to the radiation pattern described earlier, the signals reflected by the vehicles present in the observed zone are received at 4, over a predetermined duration of acquisition $T_A$, of the order of a few hundred milliseconds. The radar used is preferably a pulsed radar, so that the wave transmitted consists of a pulse train, with a carrier frequency of between 3 and 100 GHz. The use of such a radar allows distance discrimination to be obtained directly in respect of the detected vehicles. It is nevertheless possible to use a linearly frequency-modulated continuous-wave radar whose processing chain includes suitable Fourier transform processing for retrieving the distance information.

The next step referenced 5, is a conventional step of radar signal processing consisting in detecting, for each distance or distance bracket k, vehicles i which are present and in extracting the number of vehicles i detected as well as their instantaneous speed $V_i(t)$. In the case in which the radar used is a pulsed Doppler radar, step 5 can be carried out conventionally as follows, for each distance bracket k:

A sampling of signals received over the duration of acquisition is undertaken over a number N of values of the signals depending on the desired speed accuracy.

A fast Fourier transform is undertaken on the N samples obtained so as to obtain a line spectrum.

The local maxima greater than a specified threshold dependent on the range of the radar are sought, the corresponding lines relating to the vehicles detected, and the index of the lines giving the Doppler frequency directly, and hence the instantaneous speed of the vehicle.

The above processing can be refined by applying, before undertaking the fast Fourier transform, a weighting window to the samples of signals obtained, so as to reduce the amplitude of the side lobes of the spectral analysis lines. The weighting window is preferably of Hanning or Hamming type. Moreover, if it is desired to be able to determine the direction of flow of the vehicles detected, the Fourier transform over the N samples must be complex, that is to say it must use samples originating from phase and quadrature channels of the radar. It is then necessary to add a step of calculating the modulus squared of the signals emanating from the fast Fourier transform before searching for the local maxima.

The above steps 3, 4 and 5 employ techniques which are well known to radar experts and do not require more detailed description in order to understand the invention.

The process according to the invention performs the above three steps iteratively, over predetermined time intervals T. The number of vehicles detected and the instantaneous speed of these vehicles are available for each distance bracket k at the termination of each time interval T.

The automatic incident detection processing according to the invention starts from the principle that an incident is defined as a vehicle which comes to a stop. In order to detect an incident at a distance k, the process according to the invention proposes to detect the passing of a vehicle below a speed threshold. To do this, it is necessary to monitor the vehicles in each distance bracket over several time intervals T and to determine the change in their speed from one time interval to another. In FIG. 2 it has been regarded, by way of example, that step 5 yields, over the current time interval, a number $N_1$ of vehicles i located at the distance k and possessing an instantaneous speed $V_i(t)$. Moreover, the preceding iteration, done over a preceding time interval, has furnished a number $N_2$ of vehicles j also located at the distance k, and possessing an instantaneous speed $V_j(t)$.

From these data, the process according to the invention performs a first step 6 of calculating certain parameters such as the acceleration $\gamma_i(t)$ of each vehicle i and a prediction $V_i^P(t+1)$ of the speed which this vehicle will have at a following instant. Since this first step is performed at each time interval, the accelerations $\gamma_j(t-1)$ and the speed predictions $V_j^P(t)$ relating to the vehicles j processed over the preceding time interval are also available at the instant t. At the termination of the first step 6 of calculating the parameters, the process according to the invention undertakes a second step 7 of incident detection.

The first step 6 of the incident detection phase according to the invention will now be described with reference to FIG. 3, which illustrates the various calculations and tests performed during this step 6: the principle of this step consists in investigating whether certain vehicles i detected at the instant t are among the vehicles j detected at the instant t−1, this amounting to effecting a kind of correlation for one and the same distance k between some of the parameters calculated at the instant t−1, namely the number $N_2$ of vehicles j, their instantaneous speed $V_j(t-1)$, and the prediction of their speed $V_j^P(t)$, and the parameters available at the instant t, namely the number $N_1$, of vehicles i, and their instantaneous speed $V_i(t)$.

Figure 3:
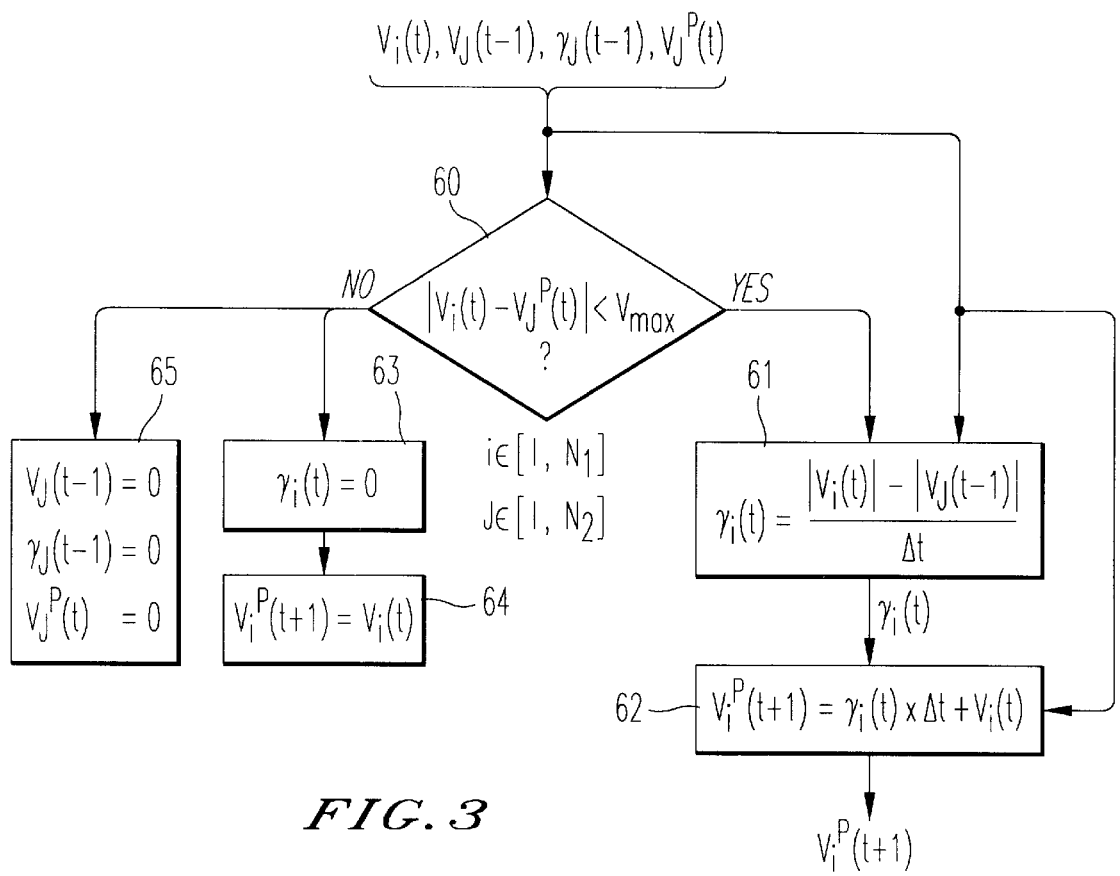
FIG. 3 details step 6 of calculating parameters of FIG. 2.

As indicated in FIG. 3 by a test 60, the investigation of correspondence between a vehicle i and a vehicle j consists in calculating, for each vehicle i and for each vehicle j, the discrepancy between the prediction $V_j^P(t)$ of the speed of the vehicle j and the instantaneous speed $V_i(t)$ of the vehicle i, and in then comparing the absolute value of the said discrepancy with a predetermined threshold value $V_{MAX}$. Three cases are possible at the termination of this test 60:

If the absolute value of the discrepancy is much less than the threshold value, vehicle i and vehicle j may be regarded as corresponding to one and the same vehicle. The acceleration $\gamma_i(t)$ of this vehicle is then calculated at 61 by applying the relation $$\gamma_i(t) = \frac{|V_i(t)| - |V_j(t-1)|}{\Delta t}$$

in which αt represents the duration between the two instants t and t−1.

The prediction of the speed of this vehicle at the instant t+1 is then calculated at 62 by applying the relation $$V_i^P(t+1) = \gamma_i(t) \times \Delta t + V_i(t)$$

if a vehicle i detected at the instant t cannot be associated with any vehicle j (test 60 negative), it must be regarded as being a new vehicle having entered the distance bracket k. In this case, the value of its acceleration $\gamma_i(t)$ is initialized to the zero value at 63, and its instantaneous speed $V_i(t)$ is made to correspond with the prediction thereof $V_i^P(t+1)$.

If a vehicle j detected at the instant t−1 cannot be associated with any vehicle i (test 60 also negative), this vehicle must be regarded as having left the distance bracket k. All the parameters relating to this vehicle j can then be set to the zero value at 65 so that they may be ignored in the remainder of the processing.

At the termination of the first step 6 of calculating parameters, there are therefore available, for each vehicle i detected, its instantaneous speed, its acceleration, the prediction of its future speed and, in certain cases, its correspondence with a vehicle j detected during the preceding time interval, together with the parameters associated with it.

As we stated earlier, the detection of an incident at a distance k consists in detecting the passing of the speed of a vehicle i below a first predetermined speed threshold $V_{thresh}$. To do this, the second step 7 of the detection phase of the process according to the invention (see FIG. 2) can perform two possible kinds of comparison:

In a first particular case, an incident is regarded as being caused by a vehicle i at the distance k when the following two conditions are met:

$$\begin{cases} V_i(t) < V_{thresh} \\ \gamma_i(t) < 0 \end{cases}$$

Another possible variant consists in regarding an incident to be caused by a vehicle i at the distance k when the following two conditions are met:

$$\begin{cases} V_i(t) > V_{thresh} \\ V_i^P(t+1) < V_{thresh} \end{cases}$$

Figure 4:
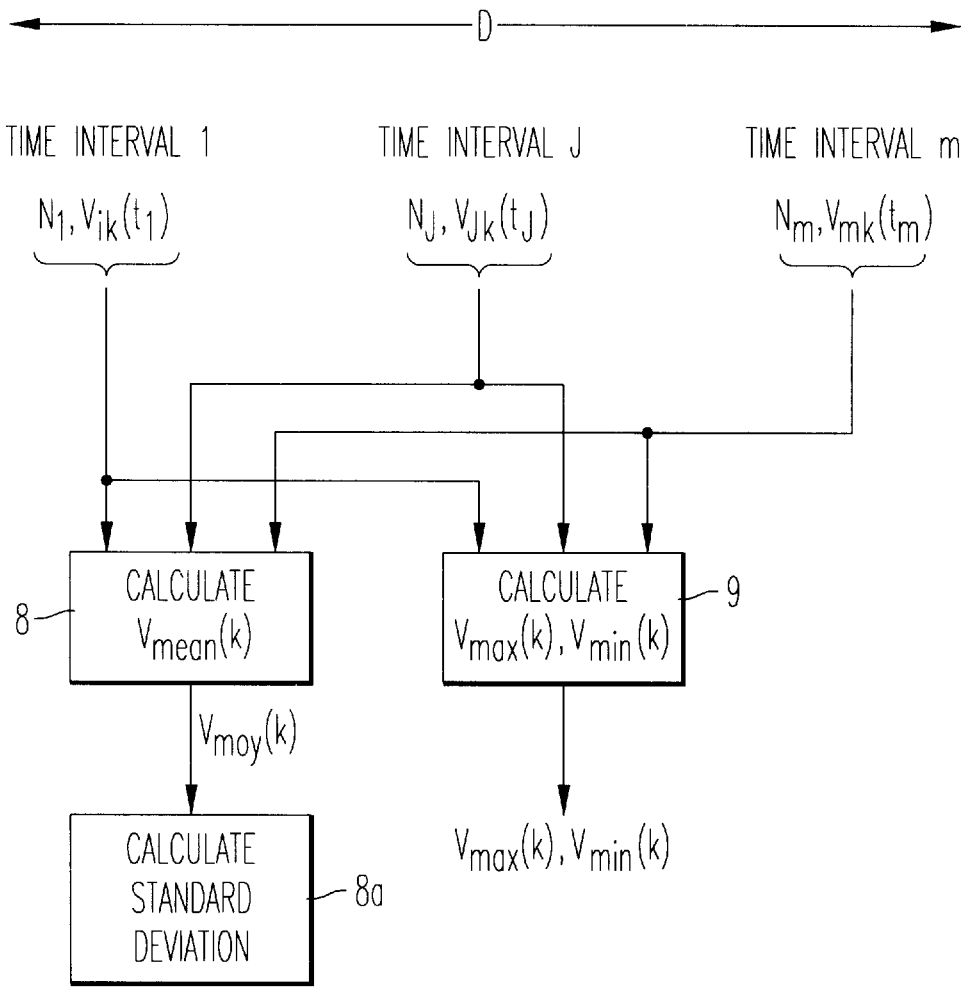
FIG. 4 illustrates possible steps of calculating additional parameters according to the invention.

Other facilities may advantageously be added to the process according to the invention: as shown in FIG. 4, it may in particular be beneficial to provide a step 8 of calculating the mean speed of the vehicles detected over several time intervals, or more generally over a predetermined duration D, and to do so for each distance bracket k, as well as a calculation step 9 making it possible to extract the maximum and minimum speeds calculated over this duration D for a given distance bracket k. In FIG. 4, the duration D has been assumed to correspond to m successive time intervals, a time interval j, for j varying from 1 to m, making it possible to detect a number $N_j$ of vehicles for a given distance k, and to deliver, at an instant $t_j$, the instantaneous speed $V_{jk}(t_j)$ of each vehicle.

FIG. 4 also shows a step 8a of calculating the standard deviation of the mean speed $V_{mean}(k)$ for a given distance bracket k.

The mean speed per distance bracket information can advantageously be used, according to the process of the invention, to perform automatic holdup or slowdown detection processing.

Figure 5:
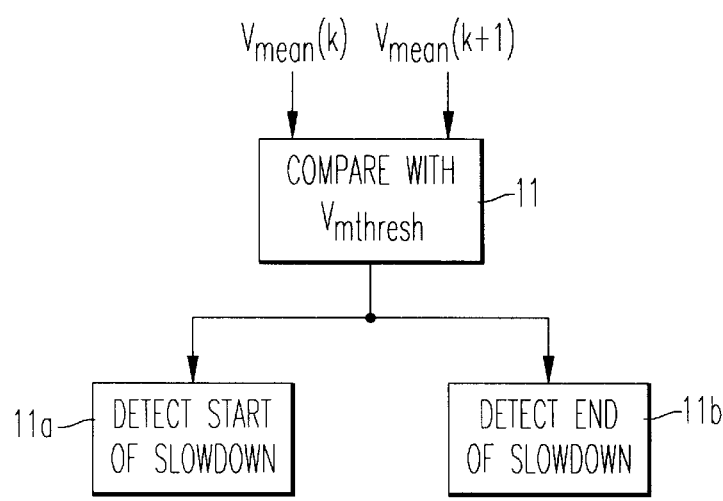
FIG. 5 illustrates the automatic detection processing on the basis of the parameters calculated in step 6 of FIG. 2.

Such processing is represented in simplified schematic form in FIG. 5.

It consists in analysing the mean speeds supplied in step 8 (FIG. 4) for two successive distance brackets k and k+1 by comparing them at 11 with a second speed threshold $V_{mthresh}$ defined beforehand.

The interpretation of the result of the comparison made at 11 depends on the direction of flow of the vehicles:
For vehicles receding from the radar system, a start of slowdown is detected at 11a when $$V_{mean}(k) > V_{mthresh} \text{ and } V_{mean}(k+1) < V_{mthresh}$$

and, an end of sslowdown is detected at 11b when $$V_{mean}(k) < V_{mthresh} \text{ and } V_{mean}(k+1) > V_{mthresh}$$

The above conclusions must be reversed when considering vehicles approaching the radar.

The automatic holdup or slowdown detection processing can advantageously be used to disable the incident detection phase. Indeed, in the case of a holdup, there is a risk of the number of incidents detected by applying the process according to the invention being large, and it may be useful to undertake a filtering of the incidents so as to limit the volume thereof.

Still with the aim of reducing the volume of processing during the automatic incident detection phase, the analysis can be restricted to the vehicles possessing a moderate speed, for example 40 km/h, these having a greater probability of generating an incident.

The process according to the invention can furthermore be improved by statistical processing represented diagrammatically at 7' in FIG. 2.

Firstly, the notion of a potential incident can be extended, according to a variant of the process according to the invention, to any vehicle travelling at an abnormally low speed relative to the traffic flow in the lanes.

In order to indicate the presence of a slow vehicle in a given distance bracket, it is sought to detect any vehicle travelling at a speed below a predefined threshold speed $V_{inf}$, and this for a duration greater than a limit duration $D_{lim}$.

The phase of automatic incident detection applied to this particular vehicle is then supplemented, according to the invention, with a step during which a check is made, at the end of the limit duration $D_{lim}$, as to whether the vehicle with instantaneous speed less than $V_{inf}$ is still detected in the relevant speed bracket. In this case, an alarm is generated indicating the presence of a slow vehicle.

Moreover, it may be beneficial, starting from the automatic incident detection process which is the subject of the invention, to extract, for a predetermined reference distance bracket $k_{ref}$ and per direction of flow, certain parameters representative of the state of the traffic in the monitored zone, such as the accurate counting of vehicles travelling, during a particular analysis period $T_{ref}$, in the distance bracket $k_{ref}$, the mean speed of these vehicles, the occupancy factor for the carriageways per direction of flow, or again the heavy goods vehicle factor. We shall detail below the steps of the process according to the invention making it possible to obtain the above parameters, these steps being shown diagrammatically at 7' in FIG. 2.

As regards the counting of the vehicles in the distance bracket $k_{ref}$, over the duration $T_{ref}$, the first step of the process according to the invention makes it possible, as we saw earlier, to detect, at an instant t, the appearance of new vehicles, that is to say those for which the acceleration was initialized to the value zero (step 63, FIG. 3), and to detect the disappearance of vehicles, that is to say those which have been eliminated from the processing (step 65, FIG. 3).

Thus, based on a plurality of automatic detection phases 6, 7, it is possible to count the number $N_{ref}$ of vehicles having passed through the distance bracket $k_{ref}$ during the analysis period $T_{ref}$ by using the results obtained in the first step of the phases. Preferably, each vehicle is counted from the moment at which the first parameter calculation step 6 eliminates it from the processing.

The mean speed $\overline{V}$ over the distance bracket $k_{ref}$ can then be deduced by applying the relation:

$$\overline{V} = \left( \frac{1}{N_{k_{ref}}} \sum_{i=1}^{N_{k_{ref}}} \frac{1}{V_i} \right)^{-1}$$

in which $V_i$ is the instantaneous speed of each vehicle counted.

The occupancy factor for the distance bracket $k_{ref}$ is defined by the presence factor for a vehicle in the distance bracket $k_{ref}$ during the analysis period $T_{ref}$. In a variant of the process according to the invention, an additional calculation step makes it possible to supply this occupancy factor $T_{occ}$ by applying the relation:

$$T_{occ} = \frac{N_i}{M \cdot Q}$$

in which:

$N_i$ is the number of detections per direction of flow obtained according to the process of the invention during the analysis period $T_{ref}$, M is the number of automatic incident detection phases undertaken during $T_{ref}$, Q is the number of lanes in the direction of flow.

Finally, the time of presence $T_p$ of each vehicle in the distance bracket $K_{ref}$, and thence the length L of these vehicles, can be deduced from the previously described vehicle counting step by applying the relation:

$$L = VT_p$$

where V is the instantaneous speed of these vehicles. This may make it possible to classify the vehicles according to their length, distinguishing between heavy goods vehicles, which have a length greater than a predefined length $L_{thresh}$, and lightweight vehicles.

The extraction of these parameters can be used to calculate in particular the heavy goods vehicles factor for the distance bracket $k_{ref}$ during the analysis period.

Figure 6:
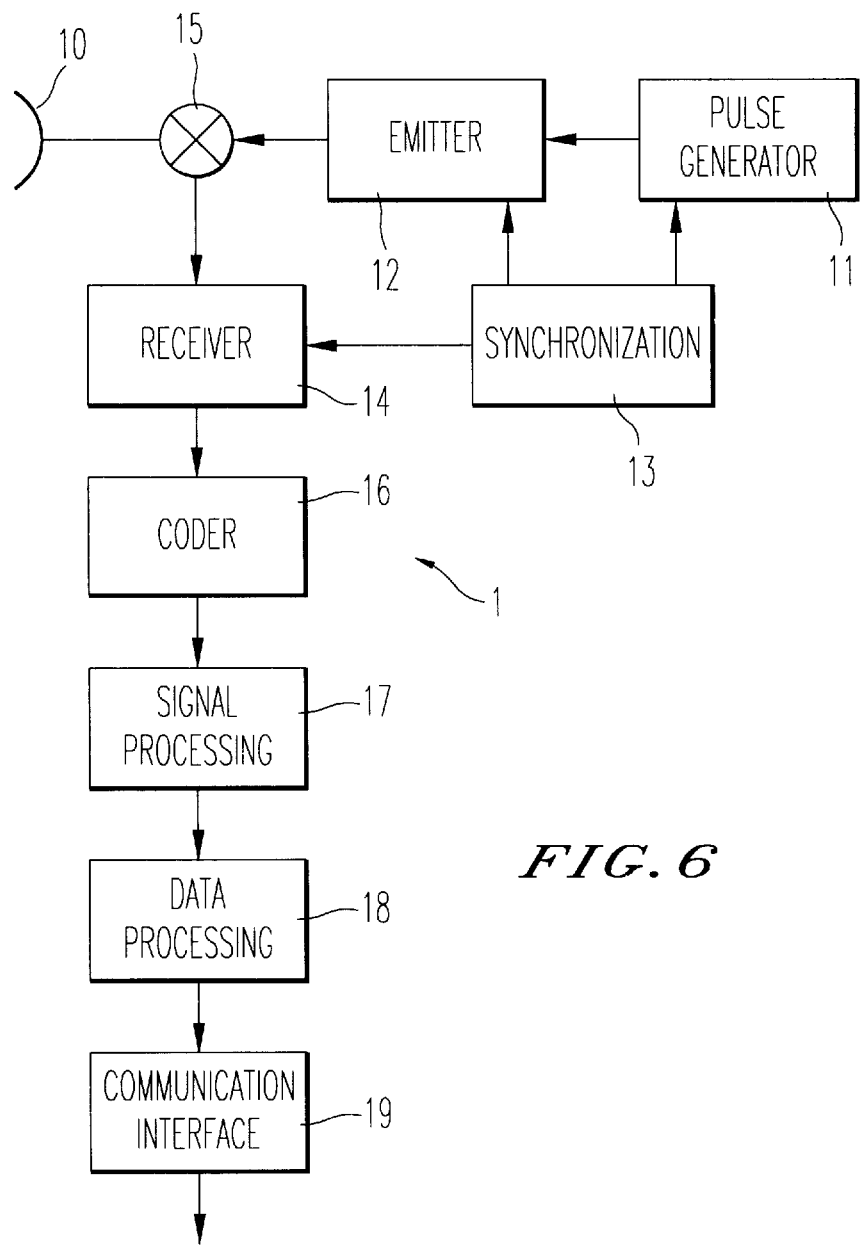
FIG. 6 represents a schematic of a possible radar system for the implementation of the process according to the invention.

FIG. 6 illustrates an example of a radar system for implementing the process according to the invention, in simplified schematic form:

Here the radar used is a pulsed radar with carrier frequency chosen between 3 and 100 GHz. The higher the frequency, the more compact will be the antenna 10 used for transmission and reception. A pulse generator 11' shapes the pulses which are amplified by the transmitter 12. Synchronization 13 allows the transmitter and receiver 14 to operate alternately, the latter receiving and amplifying the signals received by the antenna 10 via a circulator 15. The analog signals from the receiver are conventionally digitized in a coding module 16, the samples being processed in a signal processing module 17 so as to detect the vehicles, their speeds and their distances from the radar. An information processing module 18 makes it possible to implement the automatic incident and sslowdown detection phases of the process according to the invention. An interface 19 then makes it possible to transmit the information (slowdown or incident) to an information management centre.

By way of nonlimiting example, such a radar system can have a distance resolution of around 10 meters, compatible with the dimensions of the vehicles, an unambiguous speed range of ±200 km/h, and a speed resolution of around 3 km/h.

The radar system described above can be used anywhere in which rapid knowledge is desired of incidence occurring thereat or of the state of the traffic. The information supplied by the module 18 can be utilized automatically by traffic management systems, especially with the aim of informing the users of the road directly, by way of variable-message road signs.

I claim:

1. Process for monitoring the traffic of vehicles able to travel on at least two lanes, of the type consisting in transmitting a UFH wave of predetermined form in accordance with a predefined radiation pattern, in receiving signals reflected by the vehicles over a given duration of acquisition $T_A$, and in processing the signals received in such a way as to detect the vehicles and in calculating, for each distance, the number of vehicles i detected as well as the instantaneous speed $V_i(t)$ at a given instant t of each vehicle, the process wherein, the radiation pattern having an axis of aim substantially parallel to the direction of the lanes, and the steps of acquiring and processing the signals being iterated over consecutive time intervals, it furthermore includes an automatic incident detection phase comprising performing the following iterative steps:

A first step of calculating parameters including:
  investigating, at each instant t, whether a vehicle i detected in the current time interval corresponds to a vehicle j detected at an instant of the preceding time interval;
  for all the vehicles i corresponding to a vehicle j, calculating at the instant t, their acceleration $\gamma_i(t)$ by applying the relation $$\gamma_i(t) = \frac{|V_i(t)| - |V_j(t-1)|}{\Delta t}$$

in which $\alpha t$ represents the duration between the instants and t,
  as well as a prediction $V_i^P(t+1)$ of their speed at a time of the following time interval, by applying the relation $$V_i^P(t+1) = \gamma_i(t) \times \Delta t + V_i(t)$$

for the other vehicles i, initializing their acceleration $\gamma_i(t)$ to the zero value;
  eliminating from the processing all the other vehicles j not corresponding to any vehicle; and A second step of incident detection based on the parameters calculated in the first step, by detecting the passing of the speed of a vehicle i below a first predetermined speed threshold $V_{thresh}$.

2. Process according to claim 1, wherein the investigating of correspondence between a vehicle i and a vehicle j comprises calculating, for each vehicle i and for each vehicle j, the discrepancy between the prediction $V_j^P(t)$ of the speed of vehicle j and the instantaneous speed $V_i(t)$ of vehicle i, and in then comparing the absolute value of the discrepancy with a predetermined threshold value $V_{max}$ beyond which vehicles i and j are regarded as distinct.

3. Process according to claim 2, wherein the second step of incident detection comprises comparing, for each vehicle i, the speed $V_i(t)$ with the first speed threshold $V_{thresh}$, and the acceleration $\gamma_i(t)$ with the zero value, and in detecting an incident when the speed $V_i(t)$ and the acceleration are respectively less than the first speed threshold $V_{thresh}$ and the zero value.

4. Process according to claim 2, wherein the second step of incident detection comprises comparing, for each vehicle i, the speed $V_i(t)$ and the prediction $V_i^P(t+1)$ of the speed with respect to the said given first speed threshold $V_{thresh}$, and in detecting an incident when the speed $V_i(t)$ and the prediction $V_i^P(t+1)$ are respectively greater than and less than the first speed threshold $V_{thresh}$.

5. Process according to claim 2, of calculating the means speed of all the vehicles detected, at a given distance k, over a predetermined duration D.

6. Process according to claim 1, wherein the second step of incident detection comprises comparing, for each vehicle i, the speed $V_i(t)$ with the first speed threshold $V_{thresh}$, and the acceleration $\gamma_i(t)$ with the zero value, and in detecting an incident when the speed $V_i(t)$ and the acceleration are respectively less than the first speed threshold $V_{thresh}$ and the zero value.

7. Process according to claim 6, of calculating the means speed of all the vehicles detected, at a given distance k, over a predetermined duration D.

8. Process according to claim 1, wherein the second step of incident detection comprises comparing, for each vehicle i, the speed $V_i(t)$ and the prediction $V_i(t+1)$ of the speed with respect to the said given first speed threshold $V_{thresh}$, and in detecting an incident when the speed $V_i(t)$ and the prediction $V_i^P(t+1)$ are respectively greater than and less than the first speed threshold $V_{thresh}$.

9. Process according to claim 8, further comprising a step of calculating the means speed of all the vehicles detected, at a given distance k, over a predetermined duration D.

10. Process according to claim 1, further comprising a step of calculating the mean speed of all the vehicles detected, at a given distance k, over a predetermined duration D.

11. Processing according to claim 10, further comprising a step of extracting the maximum and minimum speeds calculated in regard to the vehicles detected at a given distance over the duration D.

12. Process according to claim 11, further comprising a step of calculating the standard deviation of the speed over the duration D.

13. Process according to claim 10, further comprising a step of calculating the standard deviation of the speed over the duration D.

14. Processing according to claim 10, further comprising a holdup or slowdown detection step including:
  effecting a comparison of the mean speeds $V_{mean}(k)$ and $V_{mean}(k+1)$ calculated for two successive distances k, k+1, with respect to a second speed threshold $V_{mthresh}$,
  detecting a start of slowdown or an end of slowdown on the basis of the result of the comparison.

15. Processing according to claim 14, wherein the holdup detection step disables the automatic incident detection phase when a slowdown has been detected.

16. Process according to claim 1, wherein the automatic incident detection phase is applied to any vehicle whose instantaneous speed is less than a predefined threshold speed $V_{inf}$, and in that it furthermore includes a step in which a check is made as to whether a vehicle is still detected after a duration greater than a limit duration $D_{lim}$.

17. Process according to claim 1, further comprising several successive phases of automatic detection of incidents, and in that the first step of the said phases is furthermore used to undertake a counting of the vehicles passing through a reference distance bracket $k_{ref}$ during a predefined analysis period $T_{ref}$.

18. Process according to claim 17, further comprising a step of calculating the mean speed $\overline{V}$ of the vehicles over the distance bracket $k_{ref}$ during the analysis period $T_{ref}$.

19. Process according to claim 17, further comprising a step of calculating the occupancy factor $T_{occ}$ of the distance bracket $k_{ref}$ during the analysis period $T_{ref}$ by applying the relation:

$$T_{occ} = \frac{N_i}{M \cdot Q}$$

in which:

$N_1$ is the number of detections per direction of flow obtained according to the process of the invention during the analysis period $T_{ref}$, M is the number of automatic incident detection phases undertaken during $T_{ref}$, Q is the number of lanes in the direction of flow.

20. Process according to claim 17, further comprising a step of calculating the time of presence $T_p$ of a vehicle in the distance bracket $k_{ref}$, and its length.

* * * * *